United States Patent
Brooks et al.

[11] 3,875,744
[45] Apr. 8, 1975

[54] EXHAUST METHOD AND APPARATUS FOR A DUAL CYLINDER TWO-CYCLE ENGINE

[75] Inventors: John Hawley Brooks, Encino; John Louis Zimmerer, Torrance, both of Calif.

[73] Assignee: McCulloch Corporation, Los Angeles, Calif.

[22] Filed: Dec. 18, 1972

[21] Appl. No.: 315,851

[52] U.S. Cl. .................... 60/313; 60/314; 123/65 E
[51] Int. Cl. ............................................. F02b 27/02
[58] Field of Search ............ 60/273, 312, 313, 314, 60/323; 123/65 E

[56] References Cited
UNITED STATES PATENTS
3,695,238  10/1972  Boerma ............................ 60/314

FOREIGN PATENTS OR APPLICATIONS
886,556  7/1943  France ............................... 60/314

OTHER PUBLICATIONS
Roe, J. "Exhaust Tuning" Popular Science, December, 1970. Pages 56–58.

*Primary Examiner*—Douglas Hart
*Attorney, Agent, or Firm*—Burns, Doane, Swecker & Mathis

[57] ABSTRACT

An exhaust system for a dual cylinder two-cycle engine having at least an exhaust port within each chamber. The exhaust system includes a first frustoconical cone having the small end thereof directly connected to one of the dual cylinders adjacent the exhaust port therein and a second frustoconical cone connected at the small end thereof directly to the other of the dual cylinders adjacent the exhaust port therein. A cylindrical conduit connects the large ends of the first and second frustoconical members and an exhaust conduit is tapped into the cylindrical conduit to permit exhaust gases to escape from the exhaust system.

The first and second frustoconical members serve to reflect primary positive pressure waves back to the exhaust ports in each of the dual cylinders to minimize the loss of combustible fluid through the exhaust port during scavenging of each of the working chambers. Moreover, at least one positive pressure wave is rereflected from the exhaust port in each of the dual cylinders to reinforce the primary positive pressure waves of another cylinder and thus further minimize fuel loss through the exhaust port during a scavenging process.

2 Claims, 4 Drawing Figures

PATENTED APR 8 1975　　3,875,744
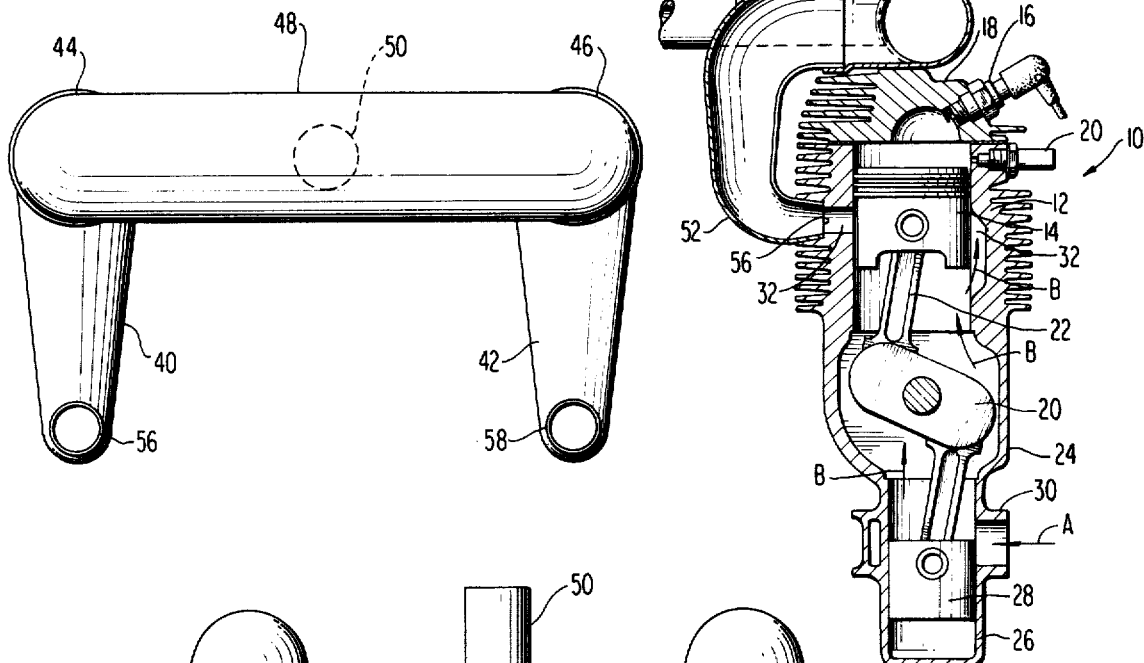
FIG.1
FIG.2
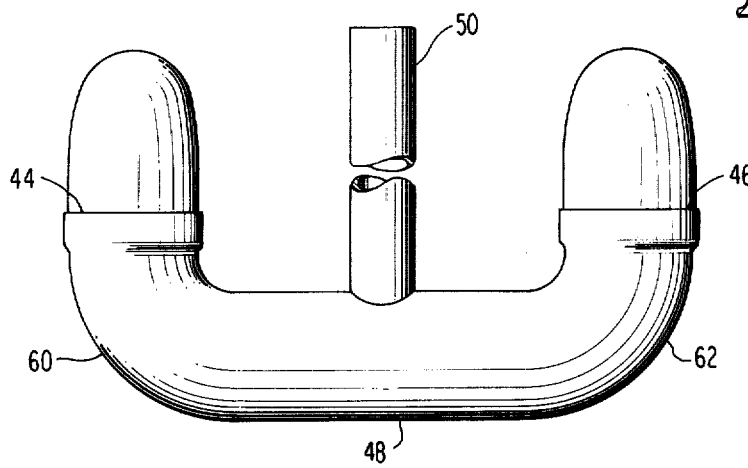
FIG.3
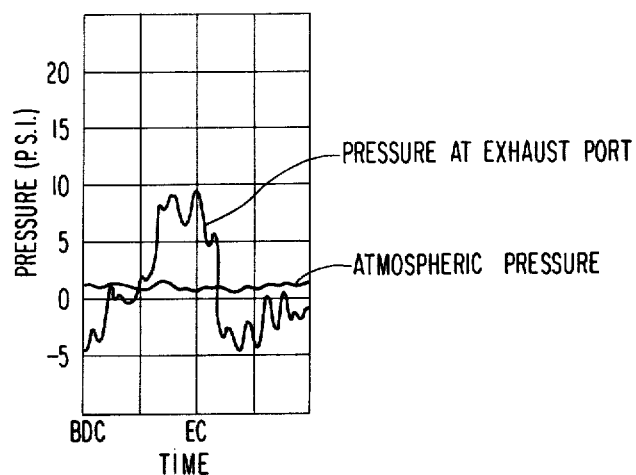
FIG.4
FRUSTOCONICAL
U-SHAPED EXHAUST

EXHAUST METHOD AND APPARATUS FOR A DUAL CYLINDER TWO-CYCLE ENGINE

BACKGROUND OF THE INVENTION

This invention relates to an exhaust system for a dual cylinder, two-cycle engine having at least an exhaust port within each cylinder. More particularly, the invention relates to an exhaust system for maximizing power and minimizing specific fuel consumption for a dual cylinder two-cycle engine of the type which may be utilized to power a snowmobile go-kart or the like.

Two-cycle engines, typically, are designed such that exhaust and inlet ports are fashioned laterally into a working cylinder wall and are uncovered by reciprocation of a piston head within the working cylinder. The exhaust port is typically uncovered about 90° from top dead center during the power stroke. Between the time the exhaust port is uncovered and the piston reaching bottom depth center an intake port is uncovered. A fresh charge of combustible fluid and air is pushed into the cylinder through the transfer port to flush out combusted gas within the cylinder and provide a combustible charge for the next power stroke.

During the period of time when the exhaust port is initially opened, it would be desirable to maintain a low pressure condition adjacent to the exhaust port, such that the spent fluid may rapidly empty from the working chamber. Moreover during the scavenging phase when the transfer port is uncovered and the fresh charge is flushing the combusted fluid from the cylinder, it would be desirable to maintain a low pressure condition adjacent to the exhaust port. However, once the piston has reached bottom dead center and starts the compression stroke, it would be desirable to provide a high back pressure adjacent the exhaust port to prevent an excessive amount of combustible fluid from escaping through the exhaust port and into the exhaust system before the exhaust port is covered by the rising piston head.

In the past, tuned exhaust systems have been disclosed for use with single cylinder, two-cycle engines which at least partially meet the above criteria by the utilization of an expansion cone within the exhaust system in combination with a contraction cone. Such a system is, for example, disclosed in Burkhart U.S. Pat. No. 3,434,280 issued Mar. 25, 1969. By the provision of an exhaust system of this type, initial scavenging of the exhaust gases is facilitated by the expansion section while at the beginning of the compression stroke a positive pressure wave is reflected from the contraction section for providing a back pressure at the exhaust port. Such an exhaust system may be said to be "tuned" by a technique of "back stuffing."

While the above described tuned exhaust system has at least a theoretical appeal for use with a single cylinder two-phase engine, room for improvement remains. In this connection such systems are often very noisy. Moreover, such systems may be too bulky and unmanageable for use in connection with multi-cylinder engines.

In this connection Tenney U.S. Pat. No. 3,665,712 issued May 30, 1972, discloses a dual cylinder two-cycle engine scroll exhaust system which at least provides a degree of compactness and noise attenuation in conjunction with a tuned exhaust system.

At least one additional system, for use with dual cylinders, has been disclosed in an article by one Soderholm entitled "System Refinements Increase Efficiency of Outboard Motor" published in Design News, May 24, 1971, beginning at page 26. This system includes a pair of megaphones which are connected together at the large ends thereof. The small ends are connected to conduits which lead to exhaust ports in a first and second working cylinder. By the provision of this system, it is reported that blow-down pulses from each cylinder are reflected presumably from the closed central connection of the megaphones, to create a high pressure condition for another cylinder just prior to exhaust port closing.

While dual exhaust systems such as disclosed by Tenney and Soderholm are of interest room for significant improvement remains. In this connection, it would be desirable to maximize the interaction of exhaust expansion and contraction chambers at each cylinder to increase the power and efficiency of a dual cylinder two-cycle engine. Further it would be highly desirable to provide a high average intensity and duration of the positive pressure pulse adjacent an exhaust port just prior to the exhaust port closing to minimize the loss of combustible fluid therefrom during the final phase of a scavenging process. Still further, it would be desirable to provide an exhaust system which is highly compact in order to minimize the space requirements for the system.

OBJECTS AND SUMMARY OF THE INVENTION

Objects

It is therefore a general object of the invention to provide a novel exhaust method and apparatus for a dual cylinder two-cycle engine which will obviate or minimize problems of the type previously described.

It is a specific object of the invention to provide a novel exhaust method and apparatus for a dual cylinder two-cycle engine of the type which will increase the power output and synergistically decrease the specific fuel consumption over that of conventional exhaust systems.

It is another object of the invention to provide a novel exhaust method and apparatus for a dual cylinder two-cycle engine which will maximize the average intensity and duration of a positive pressure pulse at the exhaust port of each cylinder just prior to closing of the exhaust port therein to minimize the loss of combustible fluid through the exhaust port during a scavenging process.

It is still another object of the invention to provide a novel exhaust method and apparatus for a dual cylinder two-cycle engine which is highly compact and efficient in design to minimize the bulk and space requirements of the exhaust system.

It is a further object of the invention to provide a novel exhaust method and apparatus for a dual cylinder two-cycle engine which may be axially tuned wherein exhaust gases from one and the other of said dual cylinders: (1) are expanded to reflect negative pressure waves back to respective exhaust ports within said dual cylinders for facilitating scavenging of the cylinders; (2) are contracted to reflect primary positive pressure waves back to respective exhaust ports within said dual cylinders for holding combustible fluid within the cylinders during a compression stroke; and (3) are rereflected to produce secondary positive pressure waves to reinforce the primary positive pressure waves at opposite exhaust ports.

It is yet a further object of the invention to provide a novel exhaust method and apparatus for a dual cylinder two-cycle engine wherein back pressure is maintained within the exhaust system.

Brief Summary

A method and apparatus intended to accomplish at least some of the foregoing objects includes an exhaust system having a first frustoconical cone with the small end thereof adapted to be connected directly with one of the cylinders of a dual cylinder two-cycle engine adjacent the exhaust port therein. A second frustoconical cone is adapted to be connected at the small end thereof to the other of the dual cylinders adjacent the exhaust port therein. A transversely extending cylindrical conduit connects the large ends of the first and second frustoconical members and an exhaust conduit is tapped into the cylindrical conduit to permit exhaust gases to escape from the exhaust system.

The first and second frustoconical members serve to expand exhaust gases leaving an exhaust port to reflect negative pressure waves back to respective exhaust ports within the dual cylinders for facilitating scavenging of the cylinders. The total axial length of the exhaust system is tuned whereby frustoconical members further serve to contract and reflect primary positive pressure waves back to respective exhaust ports within the dual cylinders for holding combustible fluid in the cylinders during a compression stroke. Moreover, the total axial length of the exhaust system is tuned to rereflect secondary positive pressure waves to reinforce the primary positive pressure waves at opposite exhaust ports.

THE DRAWINGS

Other objects and advantages of the present invention will become apparent from the following detailed description taken in conjuction with the accompanying drawings, wherein:

FIG. 1 is a cross-sectional elevational view of a dual cylinder two-cycle internal combustion engine with an exhaust system comprising the subject invention attached thereto;

FIG. 2 is a front view of the exhaust system per se including a first and second frustoconical member and a cylindrical member interconnecting the large ends of the first and second frustoconical members;

FIG. 3 is a top view of the subject exhaust system disclosing an outlet conduit tapped into the cylindrical member interconnecting the frustoconical members; and FIG. 4 is a pressure versus time graph wherein pressure is monitored adjacent an exhaust port in a dual cylinder two-cycle engine and wherein a U-shaped expansion chamber exhaust system of the subject invention is utilized.

DETAILED DESCRIPTION

Referring now to the drawings and more particularly to FIG. 1 thereof there will be seen a cross-sectional view of one cylinder of a dual cylinder two-cycle engine 10.

The two-cycle engine 10 is of a conventional design and includes a working chamber 12. Ignition of a combustible fluid within the working chamber 12 is provided by a spark system 16 connected into the cylinder head 18. Starting decompression is provided by a suitable decompression port 20 fashioned into the lateral wall of the working chamber 12.

A piston 14 is mounted for reciprocation within the working chamber 12 and connected to a crankshaft 20 by a connecting rod 22. A crankcase 24 for the engine is provided with a lower cylinder 26 for enhousing a balancing piston 28. The balancing piston inter alia serves to pump a combustible fuel and gas mixture into the crankcase 24 through port 30 as indicated by directional arrow A. Combustible fluid within the crankcase is then admitted to the working chamber 12 through the inlet bypass ports 32 in a conventional manner as depicted by flow arrows B. Exhaust from the working chamber is expelled by uncovering an exhaust port 32 as the piston 14 descends during the power stroke.

The foregoing description of one cylinder of a dual cylinder engine may be repeated with respect to the other cylinder. The cylinders are designed to function 180° out of phase and are therefore mutually complementary. In order to advantageously handle the exhaust in a dual cylinder two-cycle engine the subject exhaust system has been conceived.

Referring now to FIGS. 1, 2 and 3, it will be seen that the exhaust system comprises first and second frustoconical members 40 and 42 respectively. The large ends 44 and 46 of the frustoconical members are interconnected by an intermediate transversely extending generally cylindrical conduit 48. Outlet from the cylindrical conduit 48 is provided via an exhaust pipe 50.

Each of the frustoconical members 40 and 42 is provided in a preferred embodiment with two 90° bends as at 52 and 54, note FIG. 1. Therefore, a central axis of the frustoconical member at the small end, when the exhaust system is connected to the dual cylinder engine projects generally normal with respect to a central longitudinal axis of a corresponding working chamber. Intermediate the ends of the frustoconical members the central longitudinal axes thereof extend generally parallel with the axes of the corresponding working chambers. At the large ends of the frustoconical members the axes again extend generally normal with respect to the central longitudinal axes of the corresponding working chambers and also generally parallel with the axes of the small ends of the frustoconical members.

As depicted in FIG. 1 the small ends 56 and 58 (not shown) of the first and second frustoconical members respectively are immediately tapered to increase in cross-sectional area along the length of the frustoconical member and when mounted upon the engine serve to abut directly against a corresponding exhaust port 32.

The generally cylindrical member 48 is provided with 90° bends at the first and second ends thereof 60 and 62 for direct connection with the large ends of the first and second frustoconical member 40 and 42, note FIG. 3.

Exhaust gases within the exhaust system are permitted to escape through an exhaust conduit 50 which is placed at the largest diameter of the generally cylindrical member 48 to reduce noise transmission. More particularly by removing exhaust from the cylinder member 48 only a small part of the total pressure pulses within the exhaust system escape to the atmosphere. Such a system is appreciably superior to a single reflecting muffler which allows the total shock wave to escape at the end of the reflecting cone. Moreover such a system conserves the pulses for utilization in improving engine power output. If desired suitable resonators may be added to the exhaust conduit 50 to remove some of the higher frequencies to quiet the exhaust.

Operation

In operation as the exhaust port in one of the dual cylinders is uncovered by the piston during a power stroke exhaust gases flow into the frustoconical member connected to the exhaust port. Expansion of the gases in the frustoconical member serves to reflect negative pressure pulses back to the exhaust port thereby facilitating the flow of exhaust gases into the exhaust system.

The exhaust gases entering the divergent frustoconical member then travel through the generally cylindrical connecting member 48 to the other frustoconical member and converge. This convergence generates reflective positive pressure pulses that travel back through the cylindrical member 48 and the original frustoconical member to present positive pressure pulses at the exhaust port in the working chamber.

The total axial length of the frustoconical members 40 and 42 and the cylindrical connecting member 48 is such that the positive pressure pulses will arrive at the exhaust port just prior to closing of the exhaust port during the compression stroke of the piston.

In a like manner exhaust gases from the other one of the dual cylinders provide negative and then positive pulses at the exhaust port to initially assist in the scavenging of combusted fluid from the other one of the dual cylinders and then prevent the flow of combustible fluid out of the exhaust port during a compression stroke of the piston.

Not only, however, is the subject exhaust system designed to provide primary pressure pulses at the exhaust ports just prior to closing thereof, but also secondary positive pressure pulsations from alternate working chambers are generated which reflect between the frustoconical members and arrive from one working cylinder to the other working cylinder in a time sequence to reinforce the primary pressure pulse. This reinforcing serves to heighten the average intensity of the positive pressure pulse at the exhaust port and widen the time pressure band prior to closing of the exhaust port to maximize the retention of combustible fluid within the working chamber during the compression stroke.

The foregoing discussed maximization of back pressure at the exhaust ports due to primary and secondary reinforcing pressure pulses may be graphically appreciated by reference to FIG. 4. More particularly FIG. 4 is a pressure-time coordinate system wherein increments of 5 pounds of pressure per square inch (psi) are plotted along the ordinate and time is plotted relatively along the abscissa between a bottom dead center (BDC) position of the piston head and the exhaust port closing (EC) position. Pressure is monitored at one of the exhaust ports of the dual cylinder engine.

At bottom dead center (BDC) the pressure at the exhaust port is below atmospheric pressure. However, as the piston is rising toward closing the exhaust port the pressure at the exhaust port materially rises above the atmospheric pressure and is maintained above atmospheric over a wide band of high average intensity until the exhaust port is closed. The average exhaust pressure above atmospheric pressure just prior to closing of the exhaust port may be conservatively estimated at about 5.5 psi.

This wide band high average intensity of the back pressure at the exhaust port may be attributed to the primary reflected pressure pulses in conjunction with reinforcing from secondary pressure pulses as discussed hereinabove.

SUMMARY OF SOME OF THE MAJOR ADVANTAGES

From the foregoing it will be appreciated that the present method and apparatus provides an improved exhaust system for a dual cylinder two-cycle engine wherein the power output of the engine may be increased while the specific fuel consumption may be decreased over that achievable with conventional exhaust systems.

Another significant aspect of the subject invention is a novel method and apparatus for maximizing the average intensity and duration of a positive pressure condition at the exhaust ports of the dual cylinder two-cycle engine just prior to closing of the exhaust ports. This back pressure minimizes the loss of combustible fluid through the exhaust ports during the exhaust scavenging process.

Still another significant aspect of the invention is the highly compact and efficient design which minimizes the space requirements for the system.

A further laudible aspect of the invention is the provision of a method and apparatus for providing a negative pressure condition at the exhaust ports as the ports are opened for facilitating scavenging of exhaust from the chamber and subsequently providing primary and secondary pressure pulses to maintain a back pressure condition at the exhaust port just prior to closing of the exhaust port to minimize the loss of combustible fuel out the exhaust port during a compression stroke of the engine.

Yet a further significant aspect of the invention is the maintenance of back pressure within the exhaust system by the provision of a tuned length exhaust pipe.

Although the invention has been described with reference to a preferred embodiment it will be appreciated by those skilled in the art that additions, deletions, modifications, and substitutions and other changes not specifically described may be made which will fall within the purview of the appended claims.

What is claimed is:

1. An exhaust system for a dual cylinder two-cycle engine having at least an exhaust port fashioned within each cylinder, said exhaust system comprising:

a first tubular member having an increasing cross-sectional area transverse to the central axis of said first tubular member beginning at one end thereof and increasing to the other end thereof, said one end of said first tubular member being directly connectable to the exhaust port in one of said dual cylinders with the central axis of said first tubular member at said one end thereof extending generally normal to the central axis of said one of said dual cylinders, said first tubular member being bent approximately 90° at a location slightly downstream from said one end thereof wherein the central axis of said first tubular member lies approximately parallel with the central axis of said one of said dual cylinders and the first tubular member extends contiguous with but spaced from the exterior surface of said one of said dual cylinders, and said first tubular member again being bent approximately 90° slightly upstream from the other end thereof wherein the central axis thereof is approximately normal to the central axis of said one of said dual cylinders and parallel with the central axis of said first tubular member at said one end thereof whereby the other end of said first tubular member extends contiguous with but spaced from a top exterior surface of said one of said dual cylinders;

a second tubular member having an increasing cross-sectional area transverse to the axis of said second tubular member beginning at one end thereof and increasing to the other end thereof, said one end of said second tubular member being directly connectable to the exhaust port in the other of said dual cylinders with the central axis of said second tubular member at said one end thereof extending generally normal to the central axis of said other of said dual cylinders, said second tubular member being bent approximately 90° at a location slightly downstream from said one end thereof wherein the central axis of said second tubular member lies approximately parallel with the central axis of said other of said dual cylinders and the second tubular member extends contiguous with but spaced member from the exterior surface of said other of said dual cylinders, and said second tubular member again being bent approximately 90° slightly upstream from the other end thereof wherein the central axis thereof is approximately normal to the central axis of said other of said dual cylinders and parallel with the central axis of said second tubular member at said one end thereof whereby the other end of the second tubular member extends contiguous with but spaced from a top exterior surface of said other of said dual cylinders;

a third tubular member having a generally constant cross-sectional area interconnecting the other ends of said first and said second tubular members, said third tubular member having an axial dimension such that during scavenging of said one of said dual cylinders exhaust gases will travel from the exhaust port of said one cylinder through said first tubular member and said third tubular member to said second tubular member compress and reflect as a first positive pressure wave therefrom back to said one cylinder just prior to the exhaust port therein closing to create a positive back pressure at the exhaust port of said one cylinder and such that at least exhaust gases will travel from the exhaust port of said other of said dual cylinders through said second, third and first tubular members, compress and rereflect between said first and second tubular members and arrive as a second positive pressure wave at the exhaust port of said one cylinder to reinforce and increase the average intensity of said first positive pressure wave at the exhaust port of said one cylinder, and said third tubular member further having an axial dimension such that during scavenging of said other of said dual cylinders exhaust gases will travel from the exhaust port of said other cylinder through said second tubular member and said third tubular member to said first tubular member compress and reflect as a third positive pressure wave therefrom back to said other cylinder just prior to the exhaust port therein closing to create a positive back pressure at the exhaust port of said other cylinder and such that at least exhaust gases will travel from the exhaust port of said one cylinder through said first, third and second tubular members compress and rereflect between said first and second tubular members and arrive as a fourth positive pressure wave at the exhaust port of said other cylinder to reinforce and increase the average intensity of said third pressure wave at the exhaust port of said other cylinder; and an exhaust conduit tapped into said third tubular member to permit the escape of exhaust gase from within said third tubular member to the atmosphere.

2. An exhaust system for a two-cycle engine having first and second cylinders with first and second exhaust ports, respectively, said exhaust system comprising:

a first tubular member, the cross-sectional area of which increases from an inner end thereof to an outer end thereof;

said inner end of said first tubular member being connectable to said first exhaust port;

a second tubular member, the cross-sectional area of which increases from an inner end thereof to an outer end thereof;

said inner end of said second tubular member being connectable to said second exhaust port;

a third tubular member having a generally cylindrical configuration of generally constant cross-sectional area interconnecting the outer ends of said first and second tubular members;

exhaust opening means in said third tubular member to discharge at least some exhaust gases flowing through said third tubular member;

said tubular members being arranged to conduct a first flow of exhaust gases from said first exhaust port and to:

cause expansion of said first exhaust flow in said first tubular member for reflecting first negative pressure pulses back to said first exhaust port in a manner facilitating the discharge of said first exhaust flow from said first cylinder into said exhaust system, cause convergence of said first exhaust flow in said second tubular member for reflecting first primary positive pressure pulses back to said first exhaust port, prior to the closing thereof, in a manner resisting outward flow from said first exhaust port, and conduct re-reflected first primary pressure pulses from said first tubular member in the form of first secondary positive pressure pulses traveling toward said second exhaust port;

said tubular members being arranged to conduct a second flow of exhaust gases from said second exhaust port and to:

cause expansion of said second exhaust flow in said second tubular member for reflecting second negative pressure pulses back to said second exhaust port in a manner facilitating the discharge of said second exhaust flow from said second cylinder into said exhaust system, and cause convergence of said second exhaust flow in said first tubular member for reflecting second primary positive pressure pulses back to said second exhaust port, prior to the closing thereof, in a manner resisting outward flow from said second exhaust port, and conduct re-reflected second primary pressure pulses from said second tubular member in the form of second secondary positive pressure pulses traveling toward said first exhaust port;

said first, second, and third tubular members having combined axial lengths dimensioned to:

conduct said first secondary pressure pulses from said first tubular member toward said second exhaust port in timed sequence to the reflection of said second primary pressure pulses toward said second exhaust port such that said second primary pressure pulses are reinforced by said first secondary pressure pulses, prior to closing of said second exhaust port, to intensify the positive pressure imposed at said second exhaust port, and conduct said second secondary pulses from said second tubular member toward said first exhaust port in timed sequence to the reflection of said first primary pressure pulses toward said first exhaust port such that said first primary pressure pulses are reinforced by said second secondary pressure pulses, prior to closing of said first exhaust port, to intensify the positive pressure imposed at said first exhaust port;

the central axis of said first tubular member at said inner end thereof extends generally normal to the central axis of said first cylinder;

said first tubular member being bent apoproximately 90° at a location slightly downstream from said inner end thereof wherein the central axis of said first tubular member lies approximately parallel with the central axis of said first cylinder;

said first tubular member again being bent approximately 90° slightly upstream from the outer end therof wherein the central axis thereof is approximately normal to the central axis of said first cylinder and parallel with the central axis of said first tubular member at said inner end thereof whereby the outer end of said first tubular member is spaced from a top exterior surface of said first cylinder;

the central axis of said second tubular member at said inner end thereof extending generally normal to the central axis of said second cylinder;

said second tubular member being bent approximately 90° at a location slightly downstream from said inner end thereof wherein the central axis of said second tubular member lies approximately parallel with the central axis of said second cylinder; and said second tubular member again being bent approximately 90° slightly upstream from the outer end therof wherein the central axis thereof is approximately normal to the central axis of said second cylinder and parallel with the central axis of said second tubular member at said inner end thereof whereby the outer end of the second tubular member is spaced from a top exterior surface of said second cylinder.

* * * * *